June 7, 1938.  L. M. KEEFE  2,120,071
RECORD CONTROLLED MACHINE
Filed May 24, 1933   4 Sheets—Sheet 4
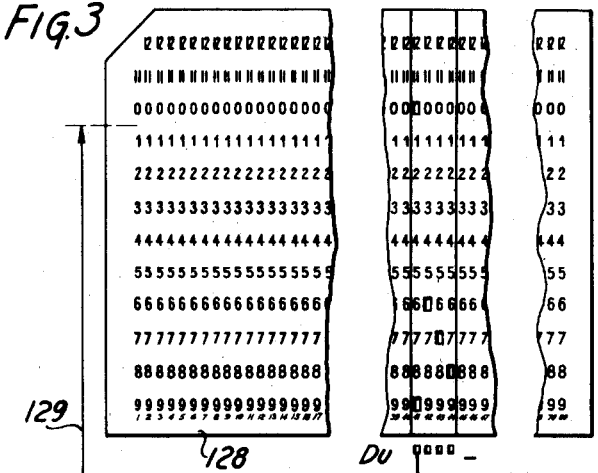
FIG.3
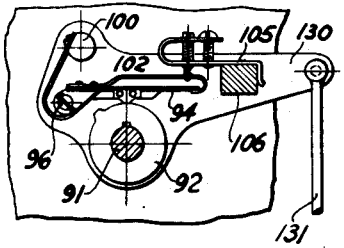
FIG.5
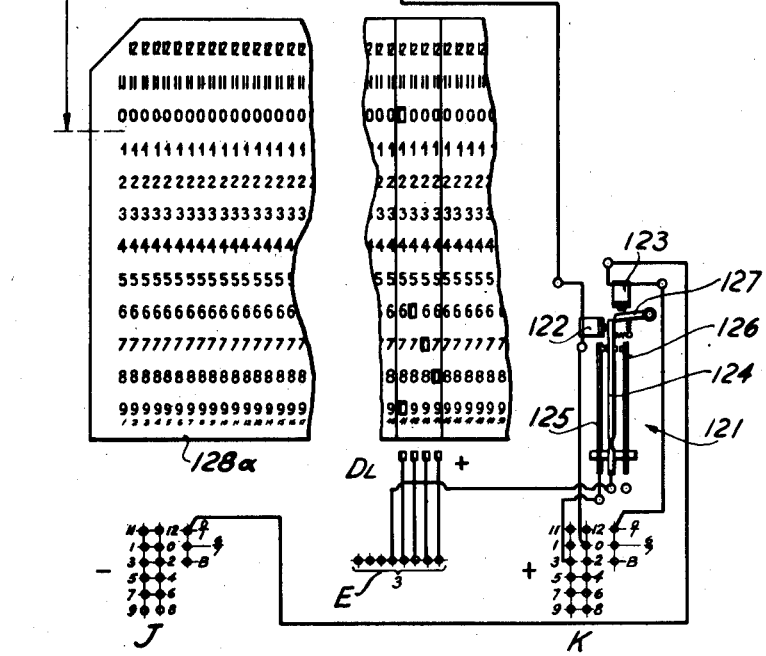
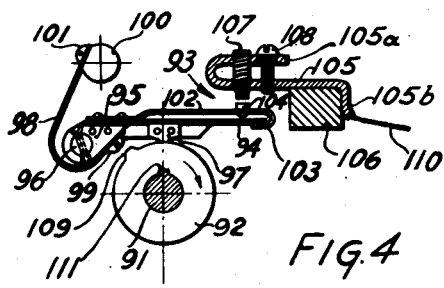
FIG.4
INVENTOR
LINCOLN M. KEEFE.
BY
ATTORNEY Patented June 7, 1938

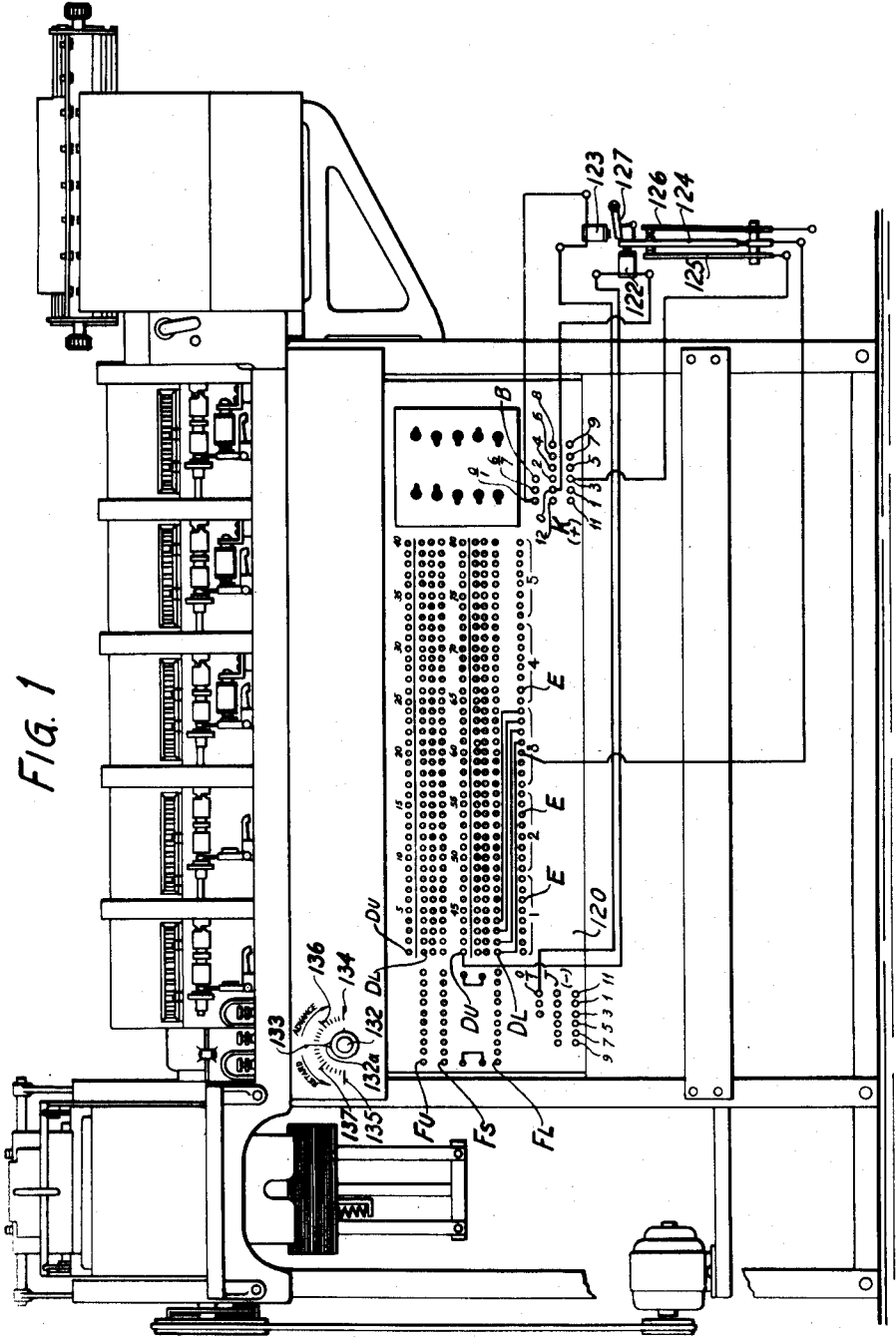

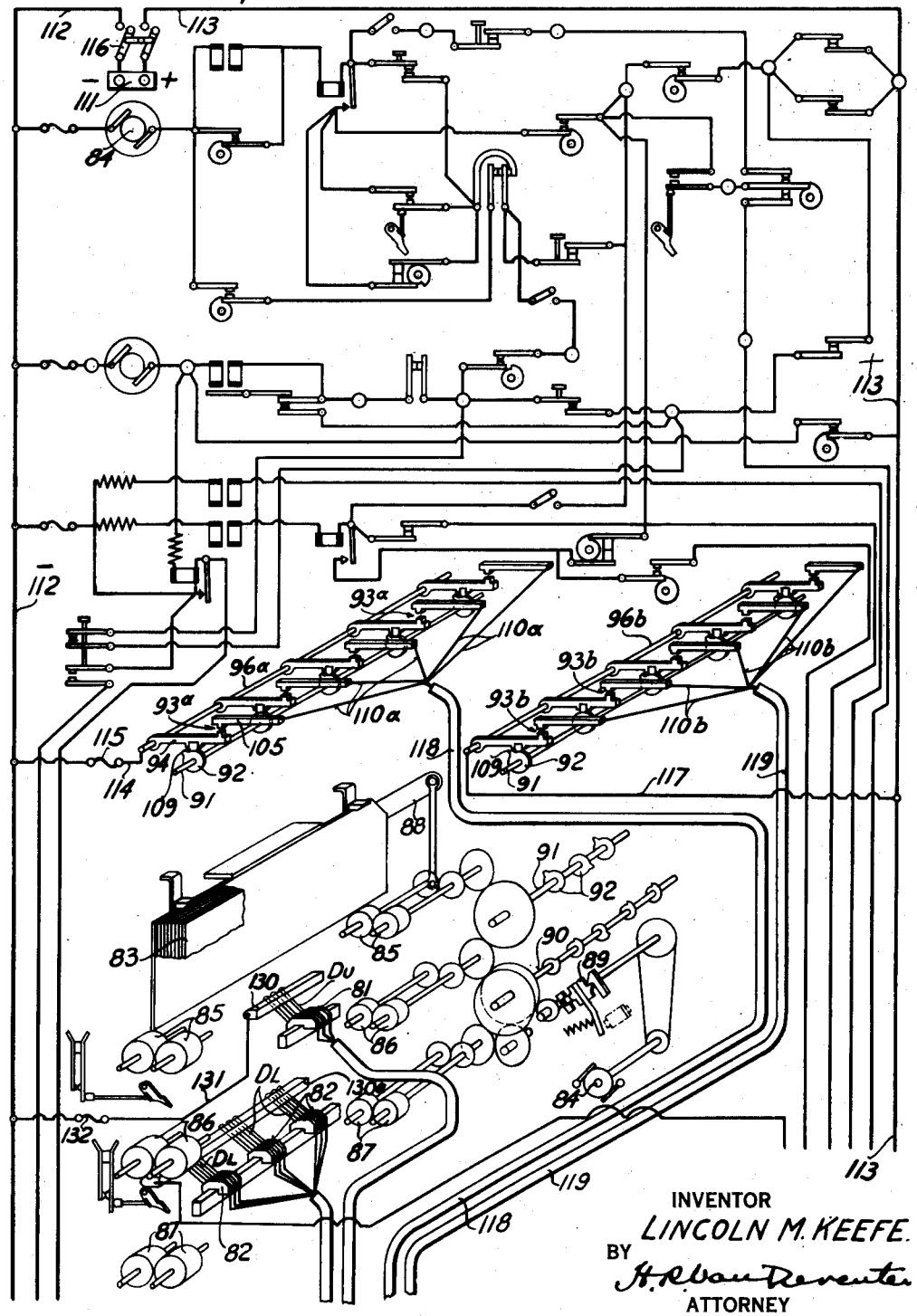

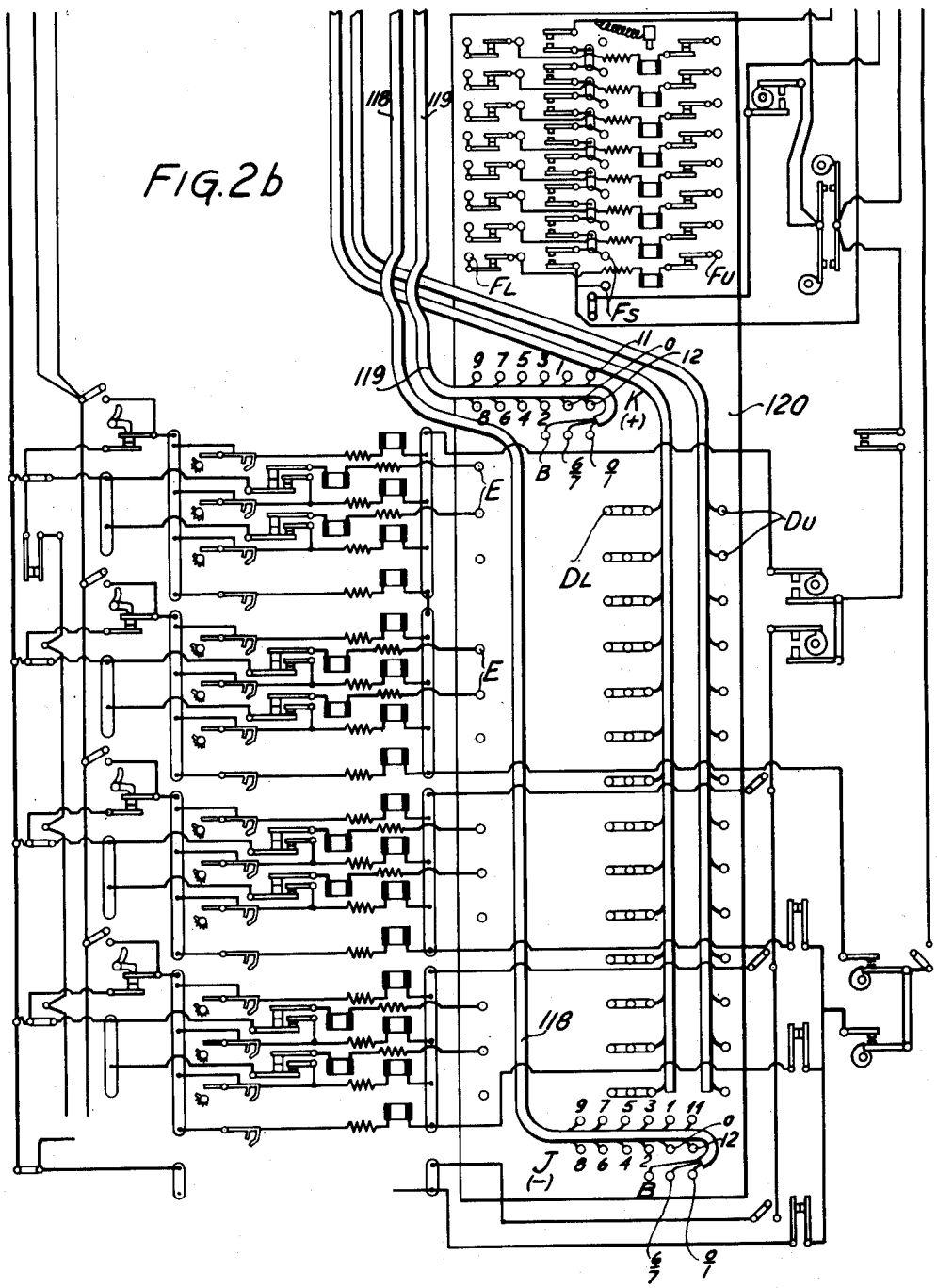

2,120,071

UNITED STATES PATENT OFFICE 2,120,071

RECORD CONTROLLED MACHINE

Lincoln M. Keefe, Springfield, Mass.

Application May 24, 1933, Serial No. 672,557

8 Claims. (Cl. 235—61.9)

This invention relates to improvements in record controlled machines and has for an object the provision, in machines of this character, of means for producing impulses of the same value as and in time with each horizontal row of the records at the sensing means of the machine, and leading wires from the producing means to a plurality of jacks in a plugboard so that one or more impulses of known value may be selectively connected to other instrumentalities for producing results hitherto unaccomplished.

A further object of the invention is the provision of means in a record controlled device for producing impulses in time with positions in between the horizontal rows of index point positions of records being sensed by the device.

Another object of the invention is the provision in a record controlled machine of means for producing impulses so timed that they occur when one record has left the sensing means and before the next succeeding record has reached the sensing means.

A further object of the invention is the provision in record controlled apparatus of means for originating impulses in a sequence synchronized with but advanced or retarded relative to the index point positions on the record.

Another object of the invention is the provision in record controlled devices of means for setting up a sequence of impulses in timed relation to index point positions in the records adapted to be selectively connected to elements of the devices or to elements cooperating therewith and adapted to operate conjointly with impulses originating at the sensing means due to holes in the records, or independently thereof.

Still another object of the invention is the provision in a record controlled machine, of means for breaking continuous current up into a plurality of sequential impulses adapted to control apparatus associated with the machine in synchronism with the operating cycles of the machine.

Although the invention may be applied to all types of record controlled devices, one embodiment thereof is illustrated and described in connection with a tabulating machine of the Hollerith type well known to the trade. Machines of this character are shown and described in Patents #1,379,268, #1,680,740 and #1,775,132 issued to C. D. Lake, and a detailed description of the elements of and the operation of these machines is unnecessary, therefore the description herein will be confined to the new features constituting the invention and the parts of the existing machines with which they cooperate.

Referring to the drawings:

Figure 1 is a front elevation of a tabulating machine into which the invention is incorporated, showing the plugboard with two extra groups of jacks forming the selectively connectible terminals of an embodiment of the invention;

Figures 2a and 2b, taken together, show a circuit diagram of the machine and include the new features of the invention;

Figure 3 is a diagrammatic sketch showing the connections between the sensing means, the counters, and jacks leading to the impulse producers, illustrating a use of the invention in connection with a tabulating machine;

Figure 4 is an elevation, partly in section, of a preferred form of contactor device; and Figure 5 is an elevation of a contactor device in which the movable arm is mounted on a base which is shiftable relative to the cam so that the timing of the impulse is variable.

The tabulating machine has a sensing means comprising a single row of upper brushes DU and a single row of lower brushes DL adapted to contact with anvils 81 and 82 respectively through perforations in the record cards.

The record cards have index point positions arranged in horizontal rows and vertical columns on the record as shown in Figure 3. The horizontal row of nines reaches the brushes first, then the horizontal row of eights, sevens, sixes, etc., and finaly the "naught" row. In the record shown herein, two extra horizontal rows are shown, namely the eleven row and the twelve row. After the naught row passes the brushes the eleven row next reaches the brushes and is followed by the twelve row.

The tabulating machine motor 84, through a clutch 89 and a series of gearing, drives a plurality of feed rollers 85, 86, and 87, and a card feeding device 88.

These rollers move the cards past the brushes at a uniform rate of speed and in timed relation to accumulating and printing elements in the machine, and they are so spaced relative to each other that when a given horizontal row of indices in one record is at the upper brushes the corresponding row in the preceding record is at the lower brushes.

The motor 84 also drives a cam shaft 90, carrying a plurality of cams for operating various contacts in the machine. As these are old and well known in the art they are not herein described in detail.

A new cam shaft 91 is driven by the train of gears associated with the motor to make one complete revolution for each card cycle of the machine. This shaft carries a plurality of cams 92 the functioning and timing of which will be presently described.

A plurality of contactor devices designated generally by the numeral 93 are provided. These are shown in detail in Figure 4 in which a movable arm 94 carrying a bearing 95 is pivoted on a shaft 96. The movable arm 94 is provided with a bumper 97 which is preferably formed of horn fibre or other suitable insulating material, which cooperates with the cam 92.

The movable arm 94 is also provided near its pivoted end with a spring 98 which may be secured to the arm by a screw 99. The other end of the spring 98 is secured to a boss or post 100 by means of a screw 101.

The post 100 is insulated from the frame of the machine but a plurality of these posts may be connected together and to one or the other lines of the current supply as will presently be described.

The movable arm 94 also carries a spring 102 having an end 103 thereof bent around and hooked under the end of the arm 94.

The spring 102 has its opposite end riveted or otherwise secured to the arm 94, and a contact point 104 is provided on the upper face of this spring adjacent to the curved end thereof.

A stationary member 105 is supported on a strip of insulation 106. This member has its end 105b bent down as viewed in Fig. 4 to partly embrace the strip 106 serving to accurately locate the contact screw 107 relative to the contact point 104.

The end 105a of the member 105 is bent in the form of a U and the holes for the screws 107 and 108 are drilled therein. The hole for the contact screw 107 is tapped or threaded in both sides of the U. The hole for the screw 108 is threaded where it appears in the straight surface of 105 but at the head of the screw 108 the hole in 105a is made larger to clear the body of the screw.

The contact screw 107 has its contact end in line with and adapted to cooperate with the contact point 104 and when the screw 107 is adjusted so that the contact points are adjusted to a proper opening, for example .025″, the screw 107 may be locked by means of the screw 108 tending to bring the sides of the U together.

A suitable conductor 110 connected to 105b leads current from the member 105 to a jack in the plugboard of the tabulating machine.

The plugboard and the arrangement of jacks therein will presently be described.

The cam 92 carried on a shaft 91 is arranged so that its lobe 109 engages the fibre bumper 97 and, moving the lever 94 upward, brings the contact point 104 into contact with the contact screw 107. As the contact point 104 is carried by a spring 102 the lever 94 may continue to move after contact between the contact points is established, thereby causing a slight rubbing or wiping of the contacts together and tending to keep them clean. Another feature of the contactor device due to the resilient mounting of the contact point 104 is the fact that, disregarding the width of the gap between the contacts where they are opened, the screw 107 may be adjusted to regulate the timing at which the contacts break, so that when 100 is connected to a source of current the device will supply from its terminal wire 110 an impulse shorter than; equal to; or of longer duration than the normal impulses from the sensing means of the tabulating machine.

The contactor devices 93 are arranged in two groups of fifteen in the embodiment shown and illustrated but it is understood that any number of these devices, singly or in groups may be used without departing from the spirit of the invention.

Referring to the diagram, Figures 2a and 2b, a plurality of movable arms 94 are grouped on a pivot shaft 96a and these arms are all connected via a wire 114 and a fuse 115 to the negative (—) wire 112 which connects to the negative (—) side of the source of current 111. In the preferred embodiment of the invention fifteen arms 94 are used. The wire 112 is also connected to the upper brushes DU of the tabulating machine.

One of the cams 92 adapted to actuate one of the arms 94 is so set on the shaft 91 that the contacts 104 and 107 make contact during the time that the horizontal 9 row of indices in a record is at the brushes of the sensing means. Another of the cams is set to close a set of contacts during the time the horizontal 8 row of indices in the record is at the brushes of the sensing means. Other cams 92 are set in time with the 7, 6, 5, 4, 3, 2, 1, 0, 11 and 12 rows of indices in the record, and thereby set up a series of twelve negative impulses each having a value of one of the horizontal rows of indices in the records.

Another of the cams 92 is set so that the contactor device associated therewith sets up an impulse of a timing between the horizontal 1 row of indices and the horizontal 0 row of the record at the brushes, and still another of the cams 92 is set to cause its contactor device to set up an impulse timed between the horizontal 7 and the 6 rows of the record at the brushes.

The fifteenth of the cams 92 is set so that the contactor device associated therewith sets up an impulse so timed that it occurs between the time one record card leaves the brushes and another card arrives at the brushes.

Wires 110a from the fifteen contactor devices just described lead negative (—) impulses via a conduit 118 to a group J of fifteen jacks which are designated on the plugboard in accordance with the values of the impulses, 9, 8, 7, 6, 5, 4, 3, 2, 1, 0, 11, 12, $$\frac{0\ 6}{1\ 7}$$

and B.

$$\frac{0}{1}$$

indicates the impulse timed between the 1 and 0 rows, $$\frac{6}{7}$$

indicates the impulse timed between the 7 and 6 rows, and B indicates the impulse timed between two records at the sensing means. As indicated by the minus sign (—) these impulses are all of negative polarity.

The second group of contactor devices 93b has its movable arms 94 grouped on a pivot shaft 96b. In the preferred embodiment fifteen devices 93b are used. These arms are connected via a wire 117 to the wire 113 which, when the switch 116 is closed, is connected to the positive (+) side of the source of current 111.

The cams operating the fifteen contactor devices in this second group are timed the same as the cams in the first group above described, one device in time with the 9 row, one with the 8 row, etc.

Wires 110b from these contactor devices are led via a conduit 119 to a group K of fifteen jacks which are designated on the plugboard in accordance with the values of the impulses, 9, 8, 7, 6, 5, 4, 3, 2, 1, 0, 11, 12, $$\frac{0\ 6}{1\ 7}$$

and B. These impulses are synchronized with the impulses of the first group, the only difference being that the latter group of impulses are of a positive (+) polarity instead of negative.

Of course it must be understood that if the tabulating machine is connected up to the source of current with the polarities indicated at 111 reversed, all of the polarities described in this specification would be reversed as well as the polarities of the various elements of the tabulating machine, and the same results would be obtained in the machine as a whole.

The tabulating machine is provided with a hopper to hold the records 83, Fig. 2a. The feeding knife actuated by the lever 88 is adapted to feed these cards singly to the rollers 85. A plurality of brushes DU are supported by a bar 130, which is connected via the wire 131, the fuse 132 and the wire 112 to the negative side of a source of current 111, when the switch 116 is closed. A plurality of cooperating members 81 is provided, one for each of the brushes DU. These members 81 are insulated from each other and are connected to a plurality of jacks in the plugboard 120. These jacks in the plugboard are also designated by the letters DU, to facilitate tracing the connections, as will presently be described.

When a card 83 is fed down to and engaged by the rollers 85, these rollers propel the card between the brushes and the cooperating members 81, and the card insulates the brushes from the members 81, except where a hole appears in the card. The appearance of a hole in the card allows a brush DU to contact with a cooperating member 81, thereby making an impulse available in one of the DU jacks in the plugboard corresponding to the column in which the hole appeared in the card.

For convenience, the brushes supported by the bar 130 are called the upper brushes, but this does not necessarily mean that these brushes should be positioned above any other brushes. By the term "upper brushes" is meant the brushes first reached by the record in its passage through the machine.

A second set of brushes DL are supported by a bar 130a, which is connected to the positive side of the source of current 111. These brushes DL may be termed the "lower brushes", which does not mean that they are necessarily positioned below the upper brushes. These brushes are the second set of brushes encountered by the record in its passage through the machine.

A plurality of cooperating members 82 is provided, one for each of the brushes DL. These members 82 are insulatedly supported, and are connected to a plurality of triple jacks in the plugboard 120. For convenience in tracing the connections these triple jacks are also designated by the letters DL.

As the lower brushes are utilized to actuate the adding and printing elements of the machine, the triple jacks are provided so that more than one adding or printing element may be connected to a single brush DL.

After the record passes between the upper brushes DU and their cooperating members 81, it is fed by means of the rollers 86 between the brushes DL and their co-operating members 82, and after being analyzed by the lower brushes the record is taken away from the lower brushes by the rollers 87.

In some cases it may be preferable to have the brushes insulated from each other and connected to the jacks in the plugboard, in which case a single cooperating member is provided for each set of brushes. The cooperating member may be rotated to provide a wiping contact with the brushes. The member cooperating with the upper brushes may be connected to the negative side of the source of current supply 111, and the member cooperating with the lower brushes may be connected to the positive side of the source of current. This arrangement is shown in co-pending application Ser. No. 563,023, filed Sept. 16, 1931.

The plugboard 120 of the tabulating machine has in addition to the J jacks, the K jacks, the DU jacks and the DL jacks, a plurality of E jacks. The E jacks are preferably arranged in banks and each bank is connected to a bank of counter wheels and/or printing bars. Referring to Figure 1, it will be noted that in the embodiment shown there are five banks of E jacks, each bank containing eight jacks.

The plugboard 120 is also provided with a plurality of control jacks FU, FL and FS. These jacks form the terminals of control magnets and contacts in the machine which control the operating functions of the machine.

Connections between the upper brush jacks DU and the control jacks FU, and connections between the lower brush jacks DL and the control jacks FL and/or the counter jacks E may be made as heretofore has been customary.

As the jacks in group J are of the same polarity as that of the upper brushes, these jacks may be connected to any jacks in the machine operable by impulses from the upper brushes. Likewise, as the jacks in group K are of the same polarity as the lower brushes, connections may be made between these jacks and any jacks capable of being actuated by impulses from the lower brushes.

Outside instrumentalities may be connected either to the jacks DU and the jacks K, or to the jacks J and the jacks K, or to the jacks DL, the jacks J and the counter jacks E, singly or collectively as to types of connections and as to groups in an infinite number of combinations thereby enabling the new and improved machine to perform operations heretofore unaccomplished.

An example of the use of the invention will now be given so that the operation thereof may be understood.

In some cases due to lack of capacity in a record card four vertical columns may be given for items constituting amounts that are for the most part under one hundred dollars, but occasionally an amount may run as high as one hundred, two hundred, or even three hundred dollars. The percentage of high amounts, it is assumed, is so low that the use of another column in the card is not warranted.

In Figure 3 a record card is shown in which columns 41, 42, 43 and 44 are utilized for amounts that are usually less than one hundred dollars ($100.00), but occasionally amounts of over three hundred dollars ($300.00) are encountered. The 12, 11, and 0 rows are used to indicate one hundred, two hundred, and three hundred, respectively.

The amount shown as punched in the card is $396.78. A hole is punched in the 9 row in column 41; another hole is punched in the 6 row in column 42; another hole is punched in the 7 row in column 43; and a hole is punched in the 8 row in column 44.

This takes care of the amount $96.78 but the amount to be recorded is $396.78, therefore the problem is to take care of the three hundred portion of the amount. As stated above the 0 row is used to give a value of 3, therefore in column 41, the same column having a 9 punched therein as above described, a hole is also punched in the 0 row. If the amount had been $196.78, the hole would have been punched in the 12 row in column 41, if the amount had been $296.78 the hole would have been punched in the 11 row in column 41.

Some other examples of amounts punched in the cards might be given to make the method of punching more thoroughly understood. If the amount were $223.10 a hole would be punched in the 11 row and another hole would be punched in the 2 row in column 41, and holes would be punched in the 3 and the 1 rows of columns 42 and 43, respectively, and no holes would be punched in column 44, in which case the 11 hole would cause the machine to print the 200 portion of the amount in accordance with the method outlined herein.

If the amount had been $303.33, only one hole would be punched in column 41 and that would be in the 0 row, and holes would be punched in the 3 row in columns 42, 43 and 44.

As the amount selected for illustrating the method of using the new device is $396.78 as described above, column 41 has holes punched in the 9 and 0 rows, and 6, 7 and 8 is punched in columns 42, 43 and 44, respectively.

A relay 121, having an actuating magnet 122 and a reset magnet 123, has a contact arm 124 carrying contacts and adapted to contact with an arm 125 when the actuating magnet 122 is energized. The magnet 122 attracts the armature 124 and a locking arm 127 keeps the arms 124 and 125 in contact until the reset magnet 123 is energized. When the magnet 123 is energized it attracts the locking arm 127, releasing the arm 124 and allowing it to break contact with the arm 125 and to establish contact with the arm 126 and remain in this relation until the actuating magnet 122 is again energized. Such a relay is fully described and illustrated in co-pending application, Ser. No. 554,191, filed July 31, 1931, now Patent 2,098,248, issued November 9, 1937. Therefore, it is only shown here diagrammatically.

The upper brush DU, in line with column 41 in the card, which will herein be termed DU41 is connected to one end of the winding of the actuating magnet 122 and the other end of this magnet is connected to the +0 jack in the group K, which as previously described is connected in the machine to a contactor device having a cam timed to giving impulses in time with the horizontal 0 row in the record.

The third register or counter is chosen for entering the amounts from the record. These counter jacks are generally designated by the letter E. The right hand jack in this group associated with the first adding wheel is connected to the lower brush in column 44, which may be termed DL44; the second jack in this group associated with the second adding wheel is connected to DL43; the third jack in this group associated with the third adding wheel is connected to DL42; the fourth jack in this group associated with the fourth adding wheel is connected to DL41; the fifth jack in this group is connected to the movable arm 124 of the relay 121.

The arm 125 of the relay 121 is connected to the +3 jack of group K, therefore, when the arm 124 contacts with the arm 125 an impulse of a timing of 3 will be sent into the fifth counter in group E3.

The reset magnet 123 of the relay 121 has one end of its winding connected to the jack $$\frac{+0}{1}$$

in the group K, and its other end is connected to the jack $$\frac{-0}{1}$$

in the group J, so that current will flow through the reset magnet 123, between the time the 1 row in the records has left the brushes and the time the 0 row reaches the brushes. The current flows through this coil by virtue of the closing of the two contactor devices, one + and one − polarity having their cams timed between the 0 and 1 rows as above described.

In Figure 3 the record at the upper brushes is designated by the numeral 128 and the same record at the lower brushes is designated by the numeral 128a. The point at which the reset occurs is indicated by the arrow 129.

Having described these connections it is assumed that the card 128 is passing through the sensing means and is engaged by the upper brushes, in column 41, the upper brush DU41 being the only one connected; the 9 hole reaches the brush DU41 first, but as the magnet 122, connected to DU41, has its return wire connected to the contactor device having 0 timing (+0 group K), no current can flow through the magnet 122. The card passes on down until the hole in the 0 row of column 41 reaches the brush DU41, and as the return wire of the magnet 122 is connected to a jack of +0 timing, current does flow from the brush DU41 via the magnet 122, the jack +0 in group K, and via the wire 110b to a contactor device 93b and via the wire 117 to the wire 113 and to the positive side of the line.

The return circuit from the upper brush DU41 may be traced (referring to Figure 2a) from the bar 130 via the wire 131 and the fuse 132 to the wire 112, which leads to the negative side of the source of current.

When the magnet 122 is energized, the armature 124 is attracted and establishes contact with the contact arm 125, as shown in Figure 3.

The same card is then engaged by the lower brushes. This is indicated by the numeral 128a. The 9 hole in column 41 reaches the lower brush DL41 first and sends an impulse into the fourth adding wheel in the group E3.

The 8 hole in column 44 next reaches the brush DL44 and sends an impulse into the first adding wheel in the group E3 followed by a 7 impulse by a brush DL43 into the second adding wheel in group E3 and a 6 impulse via the brush DL42 into the third adding wheel in the group E3.

The card passes on down past the lower brushes until the 3 row reaches the lower brushes and although no hole is punched in the 3 row an impulse from the jack +3 in group K passes via the contact arm 125 and the armature 124 to the fifth jack in the group E3, delivering to the fifth adding wheel an impulse of a timing of 3. Therefore, the counter will register 3 9 6 point (.) 7 8, the amount required.

After the 1 row in the record leaves the brushes DL and before the 0 row reaches them, an impulse passes from the $$\frac{+0}{1}$$

jack in the group K via the reset magnet 123 to the $$\frac{-0}{1}$$

jack in group J, thereby energizing the reset magnet 123, attracting the locking arm 127 and allowing the armature 124 to break contact with the contact arm 125, thereby resetting the relay 121 so that it will be ready to act when another card containing an amount greater than $100.00 arrives at the brushes.

It might be pointed out that in a tabulating machine the 0 index point positions do not normally actuate the registers because this point is the "at rest" index point of the registers. Likewise, the 11 and 12 do not normally function because the lower sensing means is not energized during the time these positions pass the brushes. Most of the tabulating machines of this character break the circuit feeding the sensing means after 0 on the lower brushes and after 11 (sometimes called X) on the upper brushes, but in this machine the 0, 11 and 12 index point positions are energized so that impulses from these positions may be utilized in the manner above described.

As these positions, 0, 11 and 12 can not and do not alone actuate the registers or controls of the machine, they may be selectively given any desired value by substituting the impulses of any timing from the improved contactor devices herein shown and described. For example, in the problem illustrating the use of the invention, 12 was given a value of 1, 11 was given a value of 2, and 0 a value of 3.

In Figure 1, the plugboard 120 of the tabulating machine is shown connected up to a relay, and the interconnections between the relay and the sensing and register elements of the machine are shown.

In the modification shown in Figure 5, the contactor device is mounted on a plate 130, which is movable relative to the cam 92. A rod 131 is suitably connected to a knob 132 mounted on the front of the tabulating machine. The connections between this rod and the knob are not shown in detail, but by turning the knob 132 to the right (Fig. 1) the timing of the impulses initiated by the contactor device is advanced relative to the index point position of the corresponding value in the record at the sensing means, or by turning the knob 132 to the left, the timing is retarded.

The pointer 132a, when pointing toward the graduation 133 indicates that the contactor device is generating impulses in synchronism with the corresponding index point positions of the records at the brushes. When the indicator 132a is pointing to the graduation 135, the impulses from the contactor devices are in each case a half step ahead of the corresponding index point positions in the record at the brushes, and when the indicator is pointing to the graduation 134, the impulses are timed to occur exactly in time with the index point position at the brushes ahead of the corresponding impulse.

In other words, when the pointer is advanced to the graduation 135, assuming that a 7 index point position is at the brushes, the impulse from the contactor device will occur at a point halfway between the 7 and the 6, and when the pointer is set on graduation 134 with a 7 index point position at the brushes, the contactor device produces an impulse having a value of 6.

The contactor devices herein shown are simple to construct, they may be cheaply made, and have been found to be absolutely reliable.

Although but one specific embodiment of this invention has been herein shown and described, it is understood that numerous details of the construction shown may be altered or omitted, or that the device may be applied to all kinds of record controlled machines without departing from the spirit of this invention as defined by the following claims:

What is claimed is:

1. In a record controlled machine having a sensing means adapted to initiate impulses in accordance with indicia arranged in horizontal rows in the records, a device in said machine for initiating other impulses each of which is normally timed to endure while one of said horizontal rows is engaged by the sensing means, manual means permanently connected to said device and adjustable from the outside of said machine for changing the timing of said second impulses relative to said first impulses, and mechanism adapted to be controlled by said impulses.

2. In a record controlled machine, a sensing means comprised of upper brushes and lower brushes adapted to initiate impulses in accordance with the indicia arranged in horizontal rows in the records, the impulses from the upper brushes being opposite in sign to those initiated by the lower brushes, a device in said machine adapted to institute a series of impulses each of which endures while one of said horizontal rows is engaged by said upper brushes, said series of impulses being like in polarity to said impulses instituted by the upper brushes, a second device similar to said first device adapted to institute a second series of impulses like in character to said first series of impulses except as to polarity, mechanism including a magnet adapted to be controlled by impulses from said lower brushes or from said second device, a relay having an actuating coil connected to one of said upper brushes and to one of said devices instituting impulses of opposite polarity to that of said brushes, connections between said magnet and a contact arm of said relay, connections between a second normally open contact arm of said relay and said first device, and a reset coil for said relay having one terminal connected to one of said devices and its other terminal connected to the other of said devices, said last connections being so arranged that an impulse from one of said devices will flow via said reset coil to the other of said devices, whereby said relay under control of a sensing brush and one of said devices controls the flow of an impulse of one timing from one of said devices to said magnet during each record cycle of the machine.

3. In a record controlled machine, an accumulator having actuating magnets associated therewith, a sensing means comprising upper and lower brushes each adapted to initiate impulses in accordance with indicia arranged in horizontal rows in the record, a device in said machine comprised of a plurality of pairs of cooperating contacts and a cam for each of said pairs, said contacts being adapted to institute a series of impulses synchronous with the engagement of the horizontal rows in the records by said brushes and of the same polarity as that of impulses instituted at the upper brushes, a second device in said machine comprised of a plurality of pairs of cooperating contacts and a cam for each of said pairs, said contacts being adapted to institute a series of impulses like said first series and of the same polarity as the impulses instituted at the lower brushes, relay means including an actuating magnet coil having one end of its winding connected to one of said upper brushes to receive an impulse of a predetermined timing, and having the other end of its winding connected to one of the contacts in said second device corresponding in timing to said predetermined timing, a pair of contact arms also forming part of said relay connected to one of the contacts in said second device and to an actuating magnet of one order in said accumulator, connections between some of said lower brushes and actuating magnets of other orders in said accumulator, and a reset coil forming part of said relay having one end of its winding connected to a contact in said first device, and the other end of its winding connected to a contact in said second device to receive an impulse of earlier timing than the predetermined value impulse delivered by said upper brush to said actuating magnet coil.

4. In a record controlled machine, an accumulator having actuating magnets associated therewith, a sensing means having upper and lower brushes adapted to initiate impulses under control of the records, a pair of contactor devices each comprised of a plurality of pairs of contact points and a cam associated with each of said pairs, said contacts being adapted to initiate other impulses synchronous with the engagement of horizontal rows in the record by said brushes, some of said second impulses being opposite in polarity to and capable of being substituted for said first impulses from the upper brushes and others of said second impulses being opposite in polarity to and capable of being substituted for said first impulses from the lower brushes, relay means having an actuating coil connected to one of said upper brushes and to one of said devices so as to be actuated while a record is at the upper brushes, a pair of contact arms in said relay interconnected to and adapted to complete paths between one of said devices and an actuating magnet of one order of said accumulator to be controlled thereby when the same record is at the lower brushes, connections between at least one of said lower brushes and an actuating magnet controlling another order in said accumulator, and a reset winding connected to both said devices to receive an impulse therefrom before said record leaves said lower brushes for resetting said relay.

5. In a record controlled machine, a sensing means including a first set of brushes and a second set of brushes, an impulse emitter adapted to institute impulses in time with and of the same electrical sign as impulses instituted at said first set of brushes, a second emitter adapted to institute other impulses in time with and of like polarity as impulses instituted at said second set of brushes, accumulating means, connections between some of the brushes in said second set and at least one section of said accumulator means, a circuit between said second emitter and another section of said accumulator means, said circuit including switching means, electrical means for closing said switch, connections between said electrical means and one of the brushes in said first set and said second emitter, and a second electrical means connected to both said emitters and adapted to open said switch.

6. In a record controlled machine, printing means, a sensing means having upper brushes and lower brushes, a contactor device for initiating impulses in time with the engagement of the horizontal rows in the record by said upper brushes, said impulses being of the same electrical sign as those instituted at the upper brushes, a second contactor device adapted to initiate a series of impulses in time with the impulses instituted by said first contactor device and of the opposite electrical sign, a relay including a winding connected between one of said upper brushes and said second contactor device, and contact arms associated with said relay, said contact arms being included in and adapted to complete a circuit between one member of said printing means and said second contactor device, and a reset coil of said relay interconnected between said first contactor device and said second contactor device to receive an impulse having a value of less than "one", whereby the relay may be reset after an impulse is delivered to said printing means by said second contactor device.

7. In a record controlled machine, a sensing means including upper and lower brushes at which impulses are initiated under control of records, printing means, a distributor adapted to institute and distribute other impulses like in electrical sign to and synchronous with the passage of index points of the record past said upper brushes, a second distributor adapted to institute and distribute other impulses like in electrical sign to and synchronous with the passage of the record past said lower brushes, a device interconnected between an upper brush of said sensing means and said second distributor so as to be actuated only by impulses in the record emanating from the index positions beyond the range of said printing means during a given record cycle, circuits interconnected between said second distributor and a magnet controlling said printing means and including contacts closed by the actuation of said device during said cycle, whereby said second distributor may deliver an impulse to said printing means magnet via said closed circuit during the record cycle subsequent to said first record cycle, and a reset coil in said device interconnected between said distributors to receive an impulse synchronous with the engagement of index positions having a value beyond the range of said printing means for resetting said device before the end of said last record cycle is reached.

8. In a record controlled machine, accumulator means, a source of current, sensing means including an upper set of brushes adapted to institute impulses and a lower set of brushes also adapted to institute impulses, a shaft in said machine having a plurality of cams thereon, two groups of contact arms actuated by said cams, one group being connected to one side of said source and the other to the other side of said source, a plurality of stationary contacts cooperating with contacts on said arms, said cams being so timed on said shaft that the arms in one group successively establish contact with their cooperating contacts simultaneously with the successive establishment, by the contact arms in the second group, of contact with their cooperating stationary contacts thereby instituting two different series of impulses in synchronism with the engagement of the index points in the record by the brushes, means for delivering an impulse from a selected pair of cooperating contacts in one of said groups to said accumulator, means for controlling said last-mentioned means by an impulse from one of said upper brushes and a selected pair of cooperating contacts in said last-mentioned group, and resetting means for said delivering means under control of a pair of cooperating contacts in each of said groups.

LINCOLN M. KEEFE.